Figure 1:
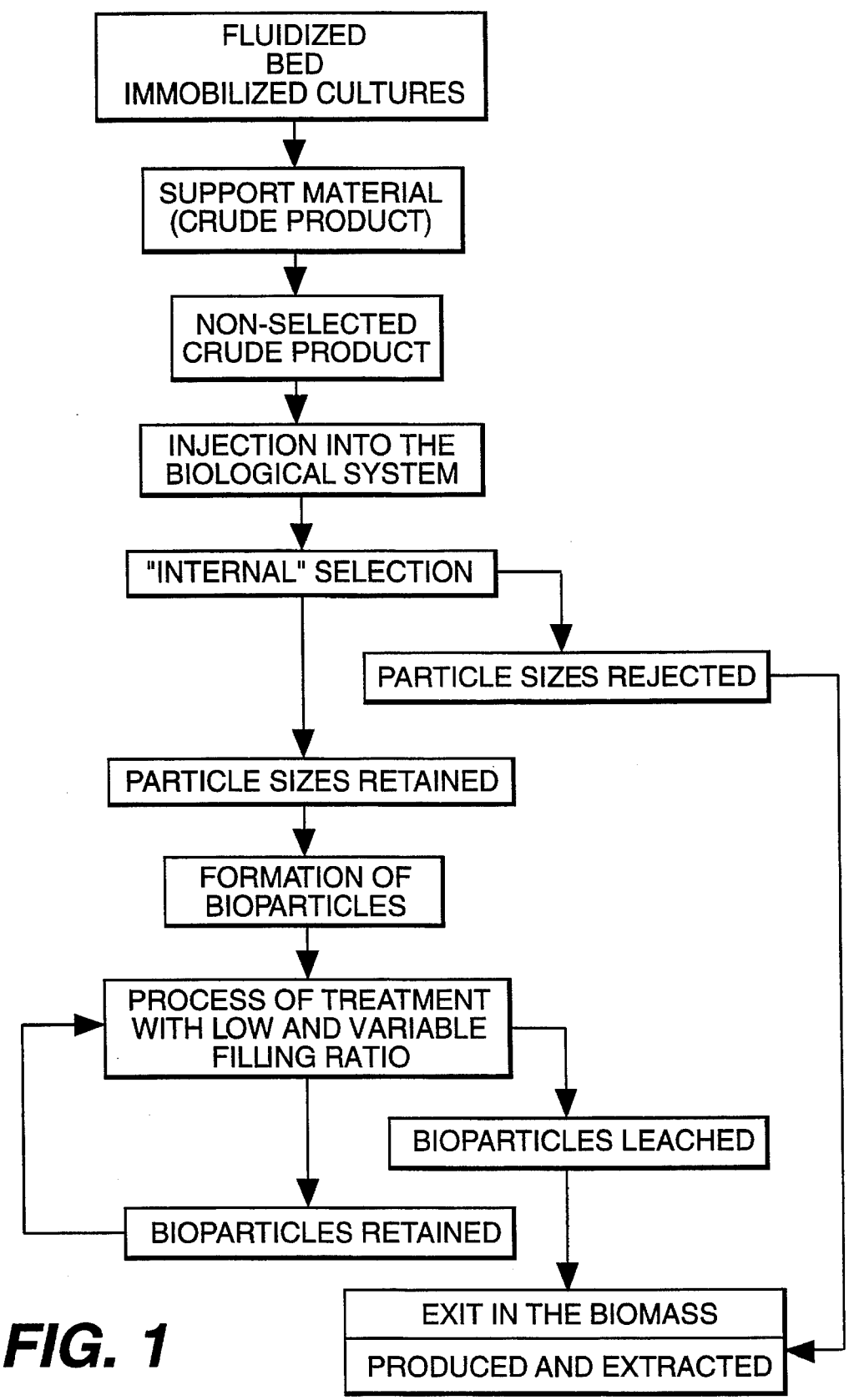

United States Patent [19]
Chudoba et al.

[11] Patent Number: 5,480,551
[45] Date of Patent: Jan. 2, 1996

[54] PROCESS FOR THE BIOLOGICAL TREATMENT OF WATER

[75] Inventors: Pavel Chudoba, Le Pecq; Michèle Pannier, Croissy S/Seine, both of France

[73] Assignee: Degremont, Rueil Malmaison, France

[21] Appl. No.: 264,146

[22] Filed: Jun. 22, 1994

[30] Foreign Application Priority Data

Jun. 23, 1993 [FR] France .................................. 93 07656

[51] Int. Cl.$^6$ ............................................ C02F 3/10
[52] U.S. Cl. ........................... 210/616; 210/617; 210/631
[58] Field of Search ..................................... 210/615–619, 210/150, 631

[56] References Cited

U.S. PATENT DOCUMENTS

| | | | |
|---|---|---|---|
| 4,589,927 | 5/1986 | Allen et al. | 210/618 |
| 4,940,546 | 7/1990 | Vogelpohl et al. | 210/617 |
| 4,983,299 | 1/1991 | Lupton et al. | 210/617 |
| 5,126,050 | 6/1992 | Irvine et al. | 210/618 |
| 5,403,487 | 11/1994 | Lodaya et al. | 210/616 |

FOREIGN PATENT DOCUMENTS

| | | |
|---|---|---|
| 2464996 | 3/1981 | France . |
| 4-235793 | 8/1992 | Japan . |
| 5-054913 | 1/1993 | Japan . |
| WO92/19548 | 11/1992 | WIPO . |

Primary Examiner—Thomas Wyse
Attorney, Agent, or Firm—Pollock, Vande Sande & Priddy

[57] ABSTRACT

Process for the biological treatment of water using a biological reactor containing a culture of microorganisms, immobilized on a granular support material, according to which an expendable powdery material is injected into the said reactor, said process being performed so as to ensure a self-selection and a self-regulation of the support material of the particle size necessary for the biological process.

6 Claims, 2 Drawing Sheets

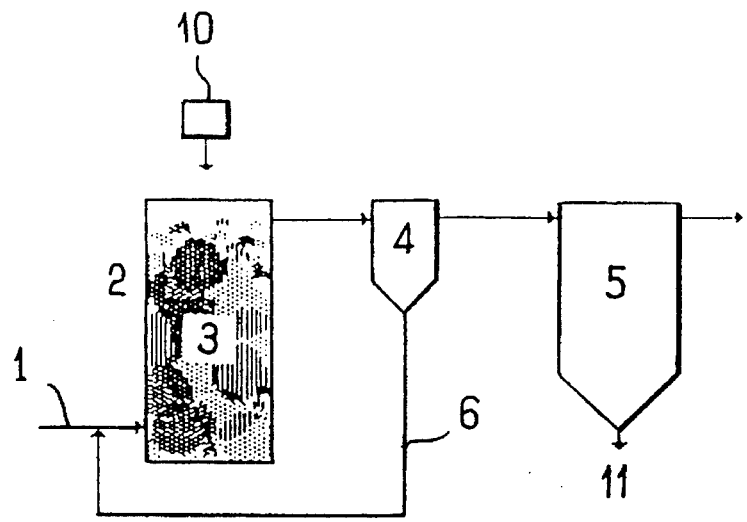
FIG_2
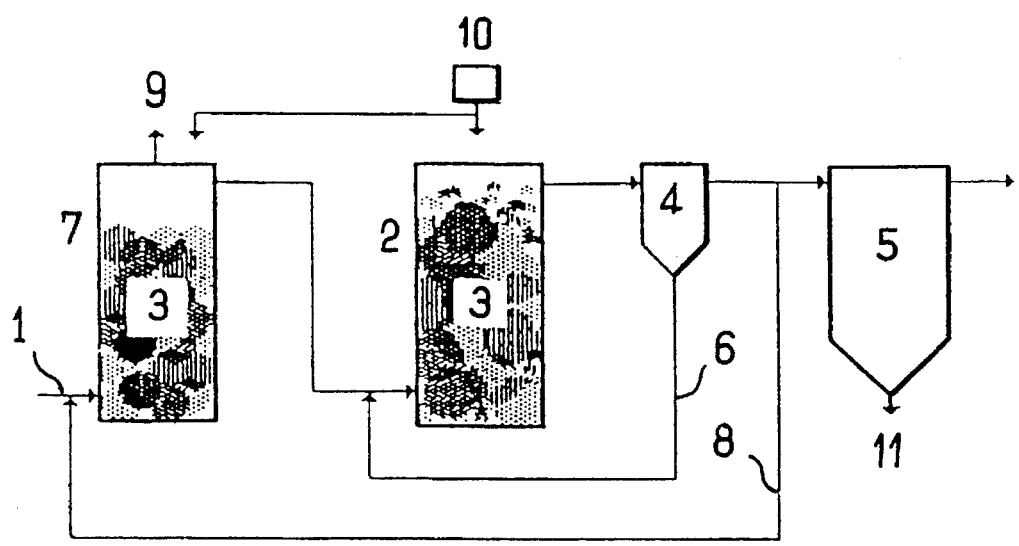
FIG_3

PROCESS FOR THE BIOLOGICAL TREATMENT OF WATER

The present invention relates to a process for the biological treatment of water.

It is known that recent processes for the treatment of water increasingly involve immobilized cultures. When the biomass is immobilized on a support material, this makes it possible to increase its concentration per unit of volume of the biological treatment plant. Thus, the biological reactions and the mass transfer generally occur with more rapid kinetics.

It is known furthermore that the activity of the biomass plays an essential role in the biodegradation process. Granular materials which are subjected to expansion, movement, turbulence or fluidization are increasingly used as support material in so-called fluidized bed reactors, preferably in three-phase medium (gas-water-particles). The movements of the particles cause more or less frequent and brutal collisions between the gas bubbles and the said particles. These collisions highly contribute to better control of a thin and active biofilm at the surface of the bioparticles (forces of attrition and shearing). In the implementation of certain processes, an external system for support material/biomass separation is necessary.

The surface area of the support material available for the immobilization of the biomass being the element determining the efficiency of the process, this necessitates either the selection of a fine material (therefore providing a high surface area) or the use of a coarser material which then necessitates a higher filling ratio for the biological reactor.

The disadvantage linked to the use of a fine material lies in the risk of losing this material by leaching during the operation of the reactor. The use of a coarser support material resulting in a high filling ratio for the reactor results in hydrodynamic constraints linked especially to reduced oxygen transfer, and a high energy consumption. Inspate of these disadvantages, the processes for the biological treatment of water most often use a coarse material as support material for the biomass, this material having, in this case, well defined particle size characteristics.

The present invention is intended to provide a process for the biological treatment of water using a biomass support material of small particle size, this process offering a self-selection of the support material in the biological process for the treatment of water.

The subject of this invention is therefore a process for the biological treatment of water using a biological reactor containing a culture of microorganisms, immobilized on a granular support material, according to which an expendable powdery material is injected into the said reactor, this process being characterized in that it is performed so as to ensure a self-selection and a self-regulation of the support material of the particle size necessary for the biological process.

According to one characteristic of the present invention, the said expendable powdery material has a particle size of between 0 and 500 microns, preferably of between 0 and 250 microns, a density greater than 1500 kg/m$^3$ and an available surface area of the order of 800 to 5000 m$^2$/m$^3$.

According to the present invention, the said injection of expendable powdery material may be continuous or in batch quantities.

According to a preferred embodiment of the process which is the subject of the invention, this powdery material may for example consist of kaolin waste.

According to the present invention, the filling ratio for the biological reactor is less than 5% by volume.

As it is understood, the process according to the invention therefore consists of a continuous or batch injection of a fine granular material into an appropriate biological reactor containing a culture of microorganisms (inoculum). The biological reactor is fed with the water to be treated, the supply of air being provided by a device for aeration with fine/medium bubbles. In anoxic (denitrification treatment) or anaerobic (phosphate removal treatment) medium, the aeration device is of course removed. The movement of the liquid and gaseous fluids occurs co-currentwise and in the ascending direction (depending on the defined gas and liquid speeds). The reactor may also comprise means for mechanical stirring (stirred reactor).

The process which is the subject of the invention makes it possible to obtain a preselection of the particle size of the granular material, suitable for immobilizing a thin and active biofilm, very rapidly, while forming bioparticles; the latter constituting practically all the biomass in the system, the hydrodynamic conditions and the extremely short residence times not permitting the development of a free biomass.

The finest inorganic particles are leached with the biomass produced during the biological reaction in the reactor. This liberated biomass results from collisions between the particles themselves and the gas bubbles. An equilibrium state is thus established in the system, over time, a portion of the fine granular material being evacuated with the biomass produced, periodic supplies of new material making it possible to preserve the necessary filling ratio for the biological reactor. This process is repeated periodically as a function of the desired filling ratio.

Practically all the biomass (autotrophs+heterotrophs) being immobilized on the bioparticles, the exchanges promoted by the thin biofilm obtained promote rapid kinetics and consequently short hydraulic residence times in the reactor.

Taking into account the vigorous stirring of the medium, the biofilm tends "statistically" not to grow larger since the attrition and shearing phenomena are very substantial. However, the particles can, for one reason or another, adapt to these conditions and, consequently, the growth of the culture can cause an increase in the thickness of the biofilm, leading to an increase in the diameter of the bioparticle and to a consecutive reduction of its density, the consequence of which is a leaching of the bioparticle from the system.

The losses are compensated in the process according to the invention by periodic or continuous injections of fresh material and the rapid formation of these bioparticles has no influence on the equilibrium state previously established. In other words, even if the concentration of the bioparticles in the system fluctuates around an established value, the yields do not vary and remain very high.

Moreover, the process according to the invention makes it possible very easily to adjust the filling ratio as a function of the temperature and, where appropriate, of the predictable load (areas with variable population, seasonal industries and the like), so as to compensate for the kinetic variations and to thus preserve a constant and maximum yield of the process.

Thus, starting with a crude expendable powdery material of a well defined particle size, within a wide range, an appropriate fraction offering a large surface area for immobilization is selected and retained by the process according to the invention.

FIG. 1 of the accompanying drawings is a block diagram illustrating the various stages of the process according to the present invention. This diagram is sufficiently explicit for it not to be subject to additional comments.

FIGS. 2 and 3 illustrate two embodiments of the apparatus used to practice the present invention.

The choice of the expendable powdery material necessitates, on the one hand, a very rapid colonization, by the microorganisms, of the newly injected fraction and, on the other hand a low cost for the crude product used.

As already mentioned above, this fine granular material injected into the biological reactor may for example consist of kaolin waste.

The characteristics which this material should have are indicated below:

small particle size (0 to 500 microns)

density>1500 kg/m$^3$ low filling ratio (less than 5% vol.)

high available surface area (800 to 5000 m$^2$/m$^3$)

high roughness of the material

"expendable", acceptable losses, capable of being replaced.

An exemplary plant in which the process which is the subject of the invention can be performed will now be described as a guide and with no limitation being implied. This description refers to FIGS. 2 and 3 of the accompanying drawings which represent respectively a plant for the biological treatment of water comprising respectively a three-phase reactor (FIG. 2) and two-phase and three-phase reactors (FIG. 3).

By referring to FIGS. 2 and 3, it can be seen that the device intended for implementing the process according to the invention essentially comprises either a three-phase fluidized bed biological reactor 2 (nitrification-FIG. 2) or a two-phase fluidized bed reactor 7 (denitrification) and a three-phase fluidized bed reactor 2 (nitrification) according to the exemplary embodiment illustrated by FIG. 3. This device additionally comprises a water+sludge/bioparticle separator 4 and a final clarifier 5, or a flotation device.

The water to be treated 1 is pumped either into the reactor 2 or into the reactor 7, where it is brought into contact with the bioparticles 3, in the presence (three-phase reactor 2) or in the absence (two-phase reactor 7) of air. These reactors 2 and 7 have a very low filling ratio of less than 5% by volume, contrary to the processes currently used.

After having been freed of the pollution (C/N), the water is separated from the bioparticles in the separator 4 which can be placed either inside, or outside the biological reactor. The treated water, containing suspended matter, and especially the fine particles of support material, is then delivered to the clarifier 5 in which the clarification of the water and the extraction of the fine particles and of the biomass produced occur. The clarified water is then evacuated into the natural medium.

The bioparticles which are retained in the separator 4 are continuously recirculated by a recirculation conduit 6, in the reactor 2 for a new cycle of treatment. A second recirculation circuit 8 ensures the supply of nitrates at the top of the plant in the reactor 7 of the exemplary embodiment of FIG. 3, where they are converted by the bioparticles 3 to gaseous nitrogen 9.

According to the invention the purges of particles systematically removed are compensated for by the periodic injections of fresh material 10, either into the three-phase reactor 2 (FIG. 2), and/or into the two-phase reactor 7 (FIG. 3). The extration of the biomass which is produced during the biological process is performed from the final clarifier 5 for example with the aid of a valve 11.

The advantages provided by the process which is the subject of the invention are the following:

appropriate selection of a support material for the microorganisms from a crude product having a wide particle size range;

use of a renewable and expendable material of low cost price of the order of 50 to 100 times less than the traditional materials used in such biological treatment processes (sand, activated carbon, Biolite, and the like);

high surface area for immobilization and exchange with a low filling ratio;

high kinetics (up to 20 times higher than that of activated sludge);

sludge of good quality in view of its treatment (low volume/concentration ratio; production of sludge of high concentration, thereby improving its quality);

high mass flow (up to 600 kg/m$^2$/per hour) relative to activated sludge (5 to 10 kg/m$^2$/per hour);

wide field of application in the treatment of water:

nitrogen (tertiary nitrification): three-phase fluidized bed 2 (FIG. 2);

carbon/nitrogen (nitrification): three-phase fluidized bed;

carbon/nitrogen as a whole (nitrification/denitrification): coupling of the two-phase 7 and three-phase 2 fluidized beds (FIG. 3);

phosphorus: if the system is coupled to a denitrification and to an anaerobic zone.

In the table below, a comparison of the kinetics of the process according to the invention with other known processes has been given.

TABLE

| Process | Kinetics (mean value) (mg N/gVM.h) at 13–15° C. |
|---|---|
| According to the invention filling ratio 1.6% | 10–20 |
| Activated sludge | 1–3 |
| Biofilter | 4–5 |
| Activated sludge + culture immobilized on solid support | 4–6 |
| Air lift immobilized culture with filling ratio of 10% | 3–14 |

The fact remains, of course, that the present invention is not limited to the exemplary embodiments described and/or represented herein, but that it encompasses all the variants thereof.

We claim:

1. Process for the biological treatment of water using a biological reactor containing a culture of microorganisms, immobilized on a granular support material, according to which an expendable powdery material is injected into the said reactor, said process being performed so as to ensure a self-selection and a self-regulation of the support material of the particle size necessary for the biological process.

2. Process according to claim 1, wherein the filling ratio for the biological reactor is less than 5% by volume.

3. Process according to claim 1, wherein the said expendable powdery material has a particle size of between 0 and 500 microns, preferably of between 0 and 250 microns, a density greater than 1500 kg/m$^3$ and an available surface area of the order of 800 to 5000 m$^2$/m$^3$.

4. Process according to claim 1, wherein the injection of the said expendable powdery material is performed continuously.

5. Process according to claim 1, wherein the injection of the said expendable powdery material is performed in batch quantities.

6. Process according to claim 1, wherein the said expendable powdery material consists of kaolin waste.

* * * * *